Aug. 29, 1967  D. FISCHER ETAL  3,339,201
DECOY ARRANGEMENT FOR A FLYING BODY
Filed March 4, 1963  5 Sheets-Sheet 1

INVENTOR.
Dietrich Fischer, Uwe Dreiss
BY
Michael S. Striker

United States Patent Office 3,339,201
Patented Aug. 29, 1967

3,339,201
DECOY ARRANGEMENT FOR A FLYING BODY
Dietrich Fischer, Munich, Germany, and Uwe Dreiss, Pittsburgh, Pa., assignors, by mesne assignments, to Uwe Dreiss, Munich, Germany
Filed Mar. 4, 1963, Ser. No. 264,999
14 Claims. (Cl. 343—18)

The present invention relates to a decoy arrangement for a flying body, and more particularly to a decoy antenna for an aircraft serving the purpose of attracting a missile pursuing the aircraft by exerting a stronger influence of the homing device of the missile than the aircraft itself.

Anti-aircraft missiles may be launched from the air, or from the ground, and are provided with homing devices which respond to optical, acoustic, electromagnetic, or infrared waves produced by the target aircraft.

In order to guide a missile provided with a radar homing device away from the aircraft, it has been proposed to produce in the aircraft jamming waves which are to supersede the radar waves received by the missile. However, the homing device of the missile can be shifted to the reception of the jamming waves, so that the missile is again accurately guided toward the aircraft. Another method of the prior art is the dropping of decoys from the pursued aircraft. Chaff, or burning torches may be dropped which render the radar reception of the homing device of the missile unclear. Furthermore, since the dropped decoys separate from the target aircraft, the missile may be guided away from the aircraft and toward the decoys. A disadvantage of this method is that the target aircraft moves rapidly away from the decoys, so that the decoys may not be effective when the missile approaches the aircraft.

A decoy arrangement for moving aircraft must consequently have two properties to be efficient:
 (1) The line of flight of the homing missile must be influenced so that the missile is no longer within a destructive range with respect to the aircraft when the war head explodes. If this is the case, the explosion cannot harm the aircraft.
 (2) The decoy arrangement must be operative during the entire time while the missile pursues the aircraft, and consequently the decoy should move at the same speed as the aircraft, and not separate from the same.
 (3) The decoy should not perform motions which require a higher degree of manoeuverability from the missile than is required for the pursuit of the aircraft so that the decoy may not lose the missile which may cause the missile to again pursue the aircraft. This requires a substantially constant distance between the aircraft and the decoy.

It is one object of the present invention to provide an aircraft with a decoy which has the above enumerated properties, and consequently overcomes certain disadvantages of known decoy arrangements.

Another object of the present invention is to provide a decoy which is capable of attracting the homing device of a pursuing missile, and is dragged by the aircraft a substantial distance behind the aircraft.

Another object of the present invention is to provide a decoy antenna spaced a substantial distance from the aircraft and emitting jamming waves which, when used for guiding a pursuing missile, direct the missile toward the decoy antenna.

Another object of the present invention is to provide an aircraft with a decoy spaced a substantial distance from the aircraft, and adapted to produce infrared radiation for guiding a pursuing missile toward the decoy instead of toward the exhaust of the aircraft.

Another object of the present invention is to provide an aircraft, or other flying body, with a decoy which can be carried in the aircraft body, and placed in an operative position spaced a substantial distance from the aircraft body when the approach of a pursuing missile is noticed.

Another object of the present invention is to burn a fuel a substantial, but constant, distance from the aircraft for attracting a missile provided with a homing device, responsive to infra-red radiation.

Another object of the present invention is to provide an aircraft with a decoy which can be selectively used for emitting radio waves or infra-red radiation.

With these objects in view, the present invention relates to a decoy arrangement for a flying body, such as an aircraft. One embodiment of the invention comprises a decoy means adapted to discharge and ignite a fuel, and connecting means for connecting the decoy means to the flying body spaced from the same. The connecting means include a tube through which fuel is supplied from the aircraft to the decoy. The infra-red radiation developed by the decoy burning the fuel is preferably stronger than the infra-red radiation produced by the exhaust of the aircraft so that an attacking missile having a heat responsive guiding system is guided toward the decoy means, and not toward the aircraft.

In one embodiment of the invention, the decoy means serves as an antenna, and jamming signals are supplied from the aircraft through the connecting means to the decoy antenna so that an attacking missile having a radar guiding system is guided toward the decoy antenna instead of toward the aircraft.

The connecting means is preferably a cable strong enough to drag the decoy means behind the aircraft, and including a flexible plastic tube for supplying the fuel to the decoy means, and a tubular wave guide for guiding the electromagnetic jamming waves to the decoy antenna.

In the preferred embodiment of the invention, the decoy means is constructed to serve as a source of jamming waves, or as a source of infra-red radiation, at the selection of the operator of the aircraft.

The decoy means can be retracted to an inoperative position located in the fuselage of the aircraft, and is placed in the operative position spaced a substantial distance from the aircraft behind the same when an attack is imminent. In one embodiment of the invention, the flexible cable and tube are wound up to form a spool when the decoy means is retracted into the fuselage.

A control system is provided in the aircraft, and includes means for determining the speed of a flying object, and when such speed is slightly greater than the speed of the aircraft, the object is identified as a pursuing missile, and the decoy is placed in the operative position spaced from the aircraft. The operator of the aircraft determines from the type of the missile whether to use infra-red radiation, or electromagnetic waves for the decoy, and sets the apparatus accordingly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
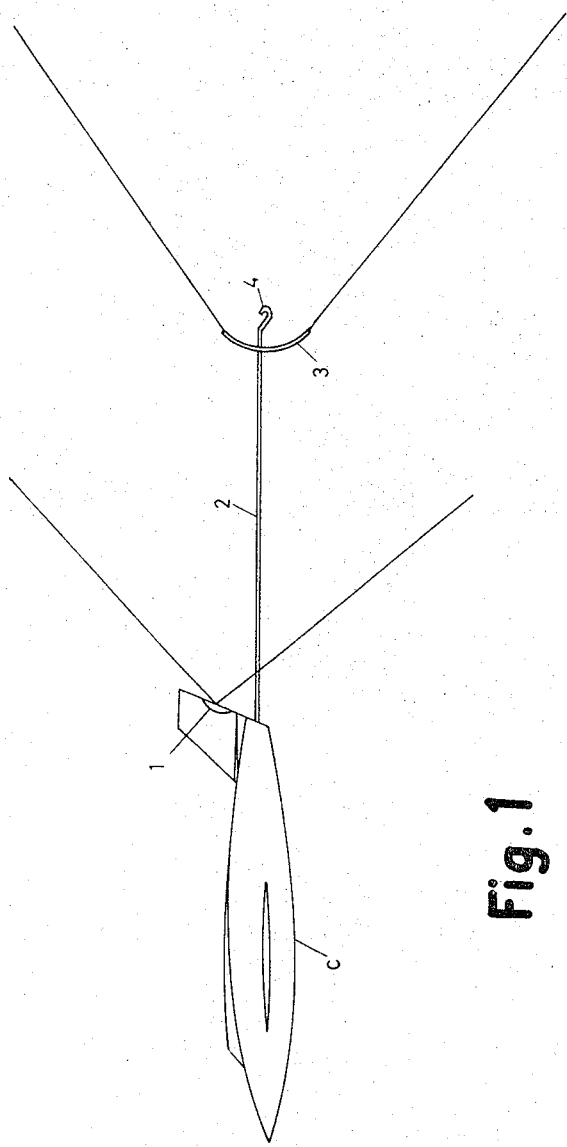
FIG. 1 is a schematic side elevation of an aircraft provided with a decoy means according to the invention.
Figure 2:
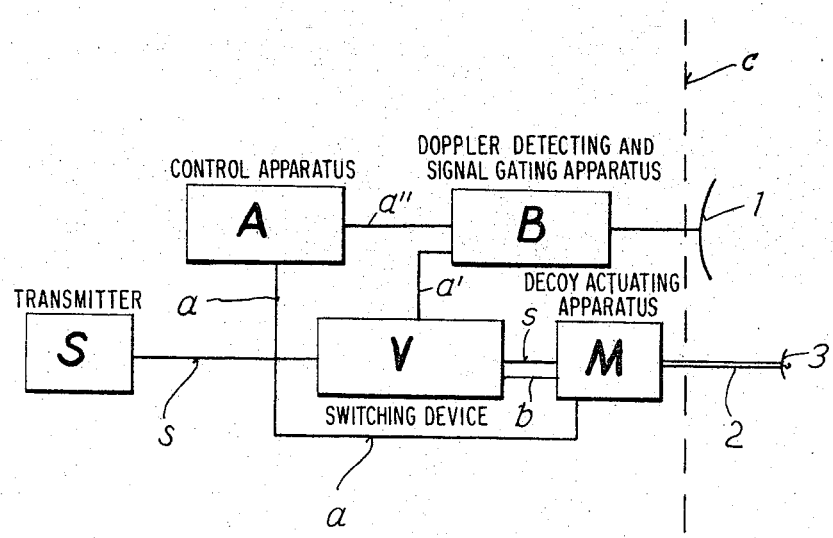
FIG. 2 is a schematic diagram illustrating the control means for the decoy arrangement.

Referring now to the drawings, and more particularly to FIG. 1, an aircraft C is provided with a warning antenna 1, and with a decoy means 3 which is connected by connecting means 2 to the aircraft C so that the decoy means 3 is dragged behind the aircraft during flight at a distance determined by the length of the connecting means 2. The decoy means 3 can be retracted into the fuselage of the aircraft where it is normally carried, unless a pursuing missile approaches the aircraft. The connecting means 2 is tubular, so that fuel can be supplied through connecting means 2 to a discharge nozzle 4. The discharged fuel is ignited by igniting means 5, see FIG. 6, to constitute a source of heat and infra-red radiation. Referring now to FIG. 2, the broken line C indicates the fuselage of the aircraft, and the warning antenna 1 and the decoy means 3 are located outside of the aircraft, as explained with reference to FIG. 1. Control means are provided in the aircraft, and include a decoy actuating apparatus M by which the decoy means 3 is pulled into the aircraft, or moved out of the aircraft in a manner which will be described hereinafter in greater detail. A transmitter S can be connected to the connecting means 2 and to the decoy means 3 by a line s through a switching device V. A control apparatus A is connected by a line a to apparatus M for actuating the same, and by a line a" to a Doppler detecting and signal gating apparatus B which is connected by a line a' to the switching device V for electrically connecting the transmitter S to the decoy means 3, if required. Apparatus A is operated by the pilot to set apparatus M to the discharge of fuel or to the transmission of waves from decoy means 5. Apparatus A also sets the apparatus B to a desired operation. Apparatus B is connected to the warning antenna 1. The signals received by the Doppler apparatus B are evaluated so that it can be determined whether the aircraft is in a radar beam, and also the wave length of the radar waves, or whether a missile approaches the aircraft at a speed higher than the speed of the aircraft. The transmitter S is capable of producing jamming signals which can be emitted by the decoy means 3. The switching device V is actuated by apparatus B when the warning antenna 1 receives signals indicating that the aircraft is in a radar beam, or that an object approaches the aircraft at a speed which is greater than the speed of the aircraft and starts decoy actuating apparatus M. Switching device V is at the same time actuated over line a' to connect transmitter S over line s with connecting means 2 and decoy means 3. The Doppler apparatus B determines the ratio between the speed $v_1$ of the attacking missile and the speed $v_2$ of the aircraft on the basis of the equation $$\frac{v_1}{v_2} \geq 1.5$$

for example, if set to this ratio.

The transmitter S may be a part of the fire control apparatus or navigating apparatus of the aircraft, and only be connected to the decoy means 3 when the aircraft is attacked.

Figure 4:
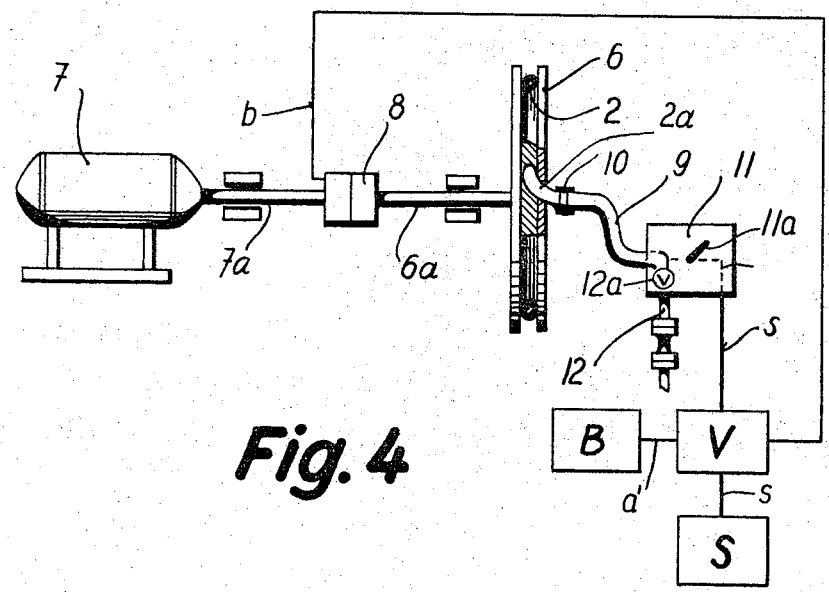
FIG. 4 is a fragmentary side elevation, partly in section along line 4—4 in FIG. 6, and illustrating apparatus for moving the decoy means into and out of the aircraft.
Figure 5:
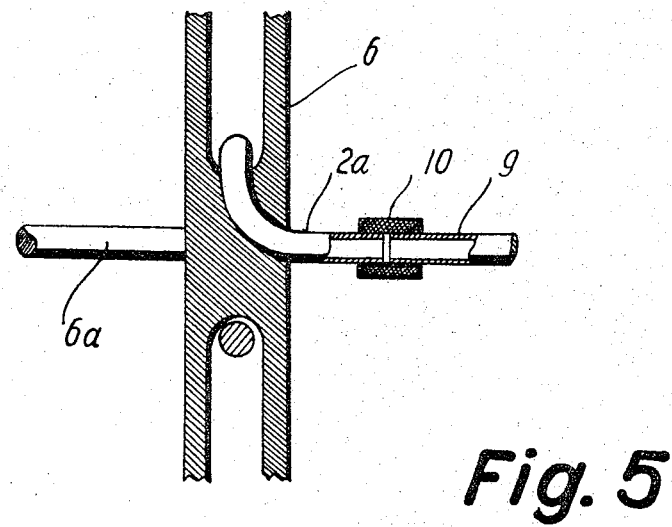
FIG. 5 is a fragmentary sectional view showing a detail of FIG. 4 on an enlarged scale.
Figure 6:
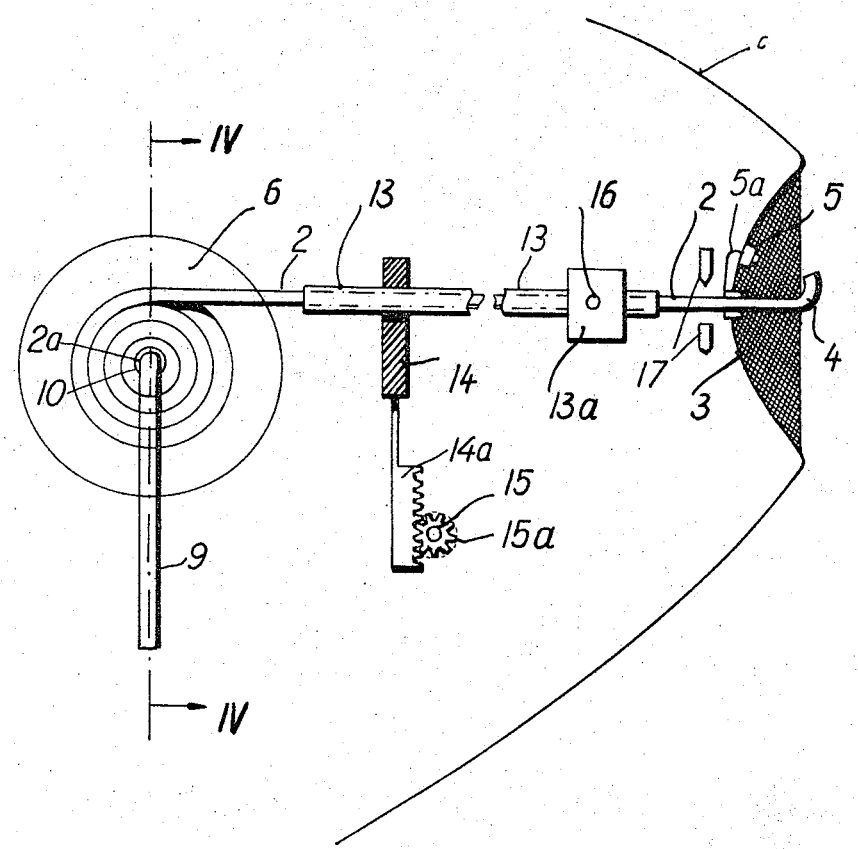
FIG. 6 is a fragmentary side elevation of a part of the apparatus shown in FIG. 4.

FIGS. 4, 5 and 6 illustrate details of the apparatus M by which the decoy means 3 is operated. As is best seen in FIG. 6, the decoy means 3 can be retracted into the fuselage of the aircraft C. The flexible connecting means 2 is guided in a tubular support 13 which has a portion 13a mounted for turning movement about a shaft 16. The other end of the tubular support 13 is supported by a member 14 which has a rack bar 14a cooperating with a gear 15a on a shaft 15 which is driven through a transmission, not shown, from a shaft 6a at a speed related to the speed of a reel 6 and of a motor 7, or may be manually operated so that connecting means 2 is raised to such a height as required by the varying diameter of the loops of the flexible connecting means 2 which is wound up on reel 6 as best seen in FIGS. 4 and 5. The innermost portion 2a of connecting means 2 is wound about the hub of the reel 6, and projects from the center of reel 6 in axial direction so as to rotate in a position coaxial with shaft 6a of reel 6. A stationary tubular element 9 has a portion aligned with portion 2a, as shown in FIG. 5, and another end leading to a device 11 which is a part of actuating apparatus M. Device 11 is connected by a line s over switching device V to the transmitter S, and by a fuel pipe 12 having a valve 12a to a fuel tank of the aircraft. The tube 9 and the connecting means 2 are identically constructed of a flexible plastic pipe suitable for conducting fuel and a tubular metallic wave guide adapted to convey electromagnetic waves. The connecting means 2 also has reinforcing means so that connecting means 2 forms a cable capable of sustaining the stress exerted by the decoy 3 when pulled behind the aircraft. The tubular end portion 2a, and the tube 9 are connected by a sealing sleeve means 10 so that fuel can flow from stationary tube 9 into the rotating tubular end portion 2a. The sealing means 10 is made of an insulating material and surrounds the annular end portions of the tubular wave guides of tubes 9 and 2a which form a capacitive coupling between the tubular wave guides of tube 9 and connecting portion 2a. In this manner, jamming waves from transmitter S through switching device V and are conducted from line s through device 11, which includes a switch 11a, the wave guide of tubular member 9, the capacity coupling in sleeve 10, the wave guide of tubular end portion 2a, and connecting means 2 to the decoy means 3 when the same is used for emitting electric waves and switching device V is actuated.

When valve 12a is shifted by control apparatus A, fuel is supplied from the fuel tank of the aircraft through pipe 12, device 11, valve 12a, tube 9 and the tube of connecting means 2 to the discharge nozzle 4 of the decoy means 3, and thereupon the igniting means 5 are energized through a wire 5a connected by the wave guide of connecting means 2 and by a switch to a battery, not shown, to ignite the fuel so that the same is burned in the region of the decoy means 3. The nozzle 4 is constructed of the same metal as is used for exhaust of the aircraft so that infra-red radiation having a corresponding spectrum is produced.

Motor 7 drives a shaft 7a which is connected by an electromagnetic clutch 8 to the shaft 6a of the reel 6. The electromagnetic clutch 8 is connected by a line b to switching device V which is operated by Doppler apparatus B under control of signals received by antenna 1 so that clutch 8 is moved to the coupling position only when apparatus B responds to a signal received by the warning antenna to produce a signal indicating the approach of a missile. When this signal is received, the reel 6 is connected by clutch 8 to the continuously rotating motor 7 so that the wound up connecting means 2 is unwound and passes through the rigid tubular support 13 shown in FIG. 6, moving the decoy means 3 and 4 to the position shown in FIG. 1. As the connecting means 2 unwinds from the reel 6, the rigid tubular support 13 is gradually lowered under the control of the gear 15 which is connected by a suitable conventional transmission, not shown, to the reel 6 so that the position of the movable support 14 corresponds to the diameter of the wound up portion of connecting means 2. If control apparatus A was set by the operator to close valve 12a and switch 11a, and apparatus B actuates through line a' the switching apparatus V, the transmitter S is connected to the decoy means 3. If the device 11 is to be selectively set to a condition in which fuel is supplied through the tubes 9 and 2, valve 12a can be operated by a signal of control apparatus A, or the valve may be manually opened.

The Doppler apparatus B responds to receive signals indicating the approach of a missile and produces an impulse supplied over line a' to switching device V which actuates the clutch 8 to connect the continuously rotating shaft 7a with shaft 6a of drum 6 so that the decoy means is moved out. In accordance with a selection of the pilot carried out on control apparatus A device 11 of device M is actuated over line a when the decoy means 3 has moved a predetermined distance away from the aircraft so that waves produced by transmitter S are emitted, or fuel is burned by the nozzle of decoy means 3.

As soon as the warning antenna 1 receives signals indicating that the aircraft is approached by a missile moving at a greater speed than the speed of the aircraft, the mechanism M is operated by actuation of clutch 8 to unwind the connecting means 2 so that the decoy means 3 assumes a position spaced such a distance from the aircraft that an explosion of the missile on the decoy means 3 cannot harm the aircraft. The distance may be, for example, between 50 meters and 150 meters. Assuming that the transmitter S transmits waves from the decoy means 3, the radiation from the decoy antenna 3 is much more intense than the radiation of the aircraft. The homing device of the missile transmits certain radiation and receives radiation and evaluates from the reflected radiation the direction and speed of the aircraft. However, if the decoy according to the invention emits corresponding radiation, the more intense radiation of the decoy is evaluated by the homing missile so that the decoy antenna 3, and not the aircraft will become the target of the missile, and will be destroyed. Due to the great distance between the decoy means 3 and the aircraft, the explosion of the missile cannot harm the aircraft. The remaining portion of the connecting means 2 can be either withdrawn, or manually severed by suitable cutting device 17, shown in FIG. 6. Of course, if the decoy was not hit by the missile, it can be retracted again and maintained in an inoperative position until the aircraft is again attacked.

Figure 3:
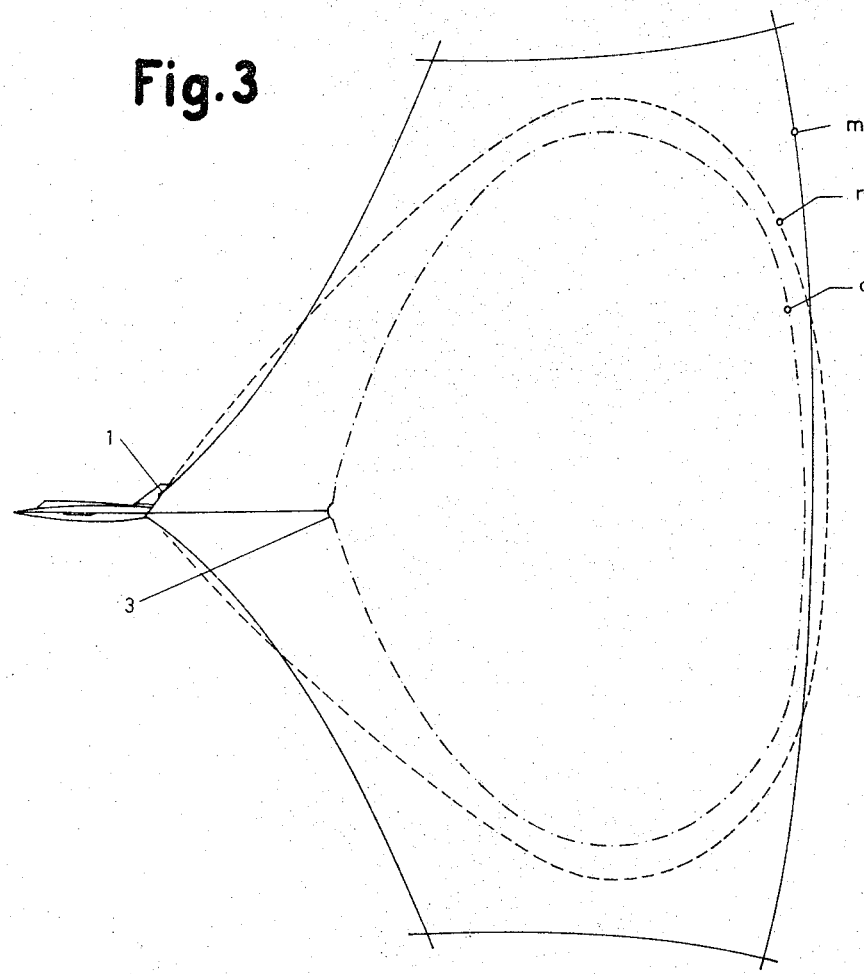
FIG. 3 is a distorted view illustrating the effective areas of the decoy and warning antennas in relation to possible missile positions.

FIG. 3 schematically illustrates in a distorted manner the area a where the radiation of the decoy antenna 3 is effective. The area r is covered by the warning antenna 1, and the area m indicates the region in which the missile may be launched to attack the aircraft. The attacking missile is always fired toward the rear of the aircraft since in this manner the curved path of the missile gradually approaches the line of flight of the aircraft so that a hit is far more likely than when the missile and aircraft would move in opposite directions. If a missile approaching an aircraft from the front would miss the aircraft only by a very short distance, it could never be directed toward the aircraft by its homing system. On the other hand, during an approach from the rear, the homing system will be fully effective as the missile gradually approaches the aircraft at a small relative speed. During such approach, the missile enters a range r of the warning antenna 1 so that the decoy means 3 is actuated, as explained above.

The operation is similar if the missile is provided with a homing device responding to infra-red radiation. Modern homing devices respond only to a limited spectrum of infra-red radiation corresponding to the spectrum produced by the metals of the exhaust system of the aircraft. In this manner, the guidance of the missile toward the sun or illuminated clouds is prevented. The discharge nozzle 4 of the decoy means of the present invention is constructed of the same metal as the exhaust pipe of the aircraft, and consequently produces a corresponding infrared spectrum to which the homing device of the missile responds. The combustion heat produced by the nozzle 4 can be made more intense than the heat of the exhaust of the aircraft, so that the missile is attracted to the decoy means 3, 4 and explodes at a safe distance from the aircraft C when hitting the decoy means 3, 4. In accordance with the present invention, the decoy means 3, 4 can be selectively used for producing infra-red radiation, or for emitting electromagnetic waves, in accordance with the particular homing system of the pursuing missile. If necessary, oxygen may be added to the fuel to increase the heat and infra-red radiation of the decoy means so that the same are a multiple of the heat and infra-red radiation produced by the aircraft. The effect may be increased by throttling the engines of the aircraft.

However, even if it is not possible to make the decoy means 3, 4 a substantially stronger source of infra-red radiation than the aircraft, the homing device of the missile will not be able to make a decision between the two sources of infra-red radiation, and the missile may change its course repeatedly between the two possible targets so that its efficiency is reduced, and it may miss the aircraft.

Since the decoy means is arranged behind the aircraft, the decoy means will be closer to the missile than the aircraft when the missile approaches the aircraft from the rear, and consequently will attract the missile even if its infra-red radiation is not stronger than the infra-red radiation of the aircraft.

The aircraft may be provided with any desired type of ECM system (Electronic Counter Measures System) for which the decoy antenna may be used.

Only small demands are made on the decoy antenna as far as size and quality are concerned, since a great radiation angle is desired. Furthermore, the decoy antenna including the connecting cable means constitutes a comparatively inexpensive expendible device, as compared with other arrangements serving the same purpose.

It will be understood that each of the elements described above, or two or more together, may also find a useful application in other types of decoy arrangements for aircraft differing from the types described above.

While the invention has been illustrated and described as embodied in a decoy adapted to produce infra-red radiation or to emit jamming waves and pulled by the aircraft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A decoy arrangement for an aircraft, comprising, in combination, decoy means; connecting means for connecting said decoy means with the aircraft so that said decoy means is pulled in flight a substantial distance behind the aircraft; and control means transported by said aircraft, said control means including a transmitter for electromagnetic waves and being connected through said connecting means with said decoy means and causing said decoy means to emit at least electromagnetic radiation adapted to attract an attacking apparatus.

2. A decoy arrangement for an aircraft, comprising, in combination, decoy means; connecting means for connecting said decoy means with the aircraft so that said decoy means is pulled in flight a substantial distance behind the aircraft; and control means transported by said aircraft, said control means being responsive to radiation so as to be actuated by an attacking apparatus emitting radiation, said control means including a transmitter for electromagnetic waves and being connected through said connecting means with said decoy means and causing, when actuated, said decoy means to emit at least electromagnetic radiation adapted to attract an attacking apparatus.

3. A decoy arrangement for a flying body, comprising, in combination, decoy means having means for discharging and igniting a fuel; connecting means for connecting said decoy means to the flying body and including a tube for supplying fuel from said flying body to said decoy means; and operating means on said flying body for moving said connecting means and said decoy means between a retracted position located in the flying body and a position in which said decoy means is spaced from the flying body whereby an attacking missile having an infrared-responsive guiding system is guided toward said decoy means when the fuel is discharged and ignited in said spaced position.

4. A decoy arrangement for a flying body, comprising, in combination, decoy means having means for discharging and igniting a fuel; connecting cable means for connecting said decoy means to the flying body and including a flexible tube for supplying fuel from the flying body to said decoy means; and operating means on said flying body for moving said connecting cable means with said flexible tube and said decoy means between a retracted position located in the flying body and a position in which said decoy means is spaced from the flying body whereby an attacking missile having an infrared-responsive guiding system is guided toward said decoy means when the fuel is discharged and ignited in said spaced position.

5. A decoy antenna arrangement for a flying body, comprising, in combination, decoy antenna means having means for discharging and igniting a fuel; means for transmitting electric jamming signals from said decoy antenna means whereby an attacking flying body having a radar homing system or an infrared-responsive homing system is guided toward said decoy antenna means; and means for connecting said decoy antenna means with the flying body spaced from the same a substantial distance exceeding the range of destructiveness of the attacking flying body.

6. A decoy antenna arrangement for a flying body, comprising, in combination, decoy antenna means having means for discharging and igniting a fuel; connecting means for connecting said decoy antenna means to the flying body and including wave guide means and a tube for supplying fuel from the flying body to said decoy antenna means; operating means on said flying body for moving said connecting means with said tube and said decoy antenna means between a retracted position located in the flying body and an operative position in which said decoy antenna means is located spaced a substantial distance from the flying body; transmitter means on the flying body for producing jamming signals; and means for selectively supplying fuel to said tube, or jamming signals from said transmitter means to said wave guide means, whereby an attacking flying body having an infrared-responsive homing system or a radar homing system may be guided toward said decoy antenna means in said operative position.

7. A decoy antenna arrangement for a flying body, comprising, in combination, decoy antenna means having means for discharging and igniting a fuel; connecting means for connecting said decoy antenna means to the flying body and including tubular wave guide means and a tube for supplying fuel from the flying body to said decoy antenna means; operating means on said flying body for moving said connecting means with said tube and said decoy antenna means between a retracted position located in the flying body and an operative position in which said decoy antenna means is located spaced a substantial distance from the flying body; control means having an antenna secured to the flying body and adapted to receive radar signals; transmitter means on the flying body connected to said control means and adapted to supply jamming signals to said decoy antenna means when said antenna receives signals; and means for selectively supplying fuel to said tube, or jamming signals from said transmitter means to said wave guide means, whereby an attacking flying body having an infrared-responsive homing system or a radar homing system may be guided toward said decoy antenna means in said operative position.

8. A decoy antenna arrangement for a flying body, comprising, in combination, decoy antenna means having means for discharging and igniting a fuel; connecting means for connecting said decoy antenna means to the flying body and including tubular wave guide means and a tube for supplying fuel from the flying body to said decoy antenna means; operating means on said flying body for moving said connecting means with said tube and said decoy antenna means between a retracted position located in the flying body and an operative position in which said decoy antenna means is located spaced a substantial distance from the flying body; an antenna secured to the flying body and adapted to receive radar signals; control means on the flying body connected to said antenna and to said operating means and adapted to automatically actuate said operating means to effect movement of said connecting means with said decoy antenna from said retracted position to said spaced position when said antenna receives radar signals; transmitter means on the flying body for producing jamming signals; and means for selectively supplying fuel to said tube or jamming signals from said transmitter means to said wave guide means whereby an attacking flying body having an infrared-responsive homing system or a radar homing system may be guided toward said decoy antenna means in said operative position.

9. A decoy antenna arrangement for a flying body, comprising, in combination, decoy antenna means having means for discharging and igniting a fuel; connecting means for connecting said decoy antenna means to the flying body and including tubular wave guide means and a tube for supplying fuel from the flying body to said decoy antenna means; operating means on said flying body for moving said connecting means with said tube and said decoy antenna means between a retracted position located in the flying body and an operative position in which said decoy antenna means is located spaced a substantial distance from the flying body; an antenna secured to the flying body and adapted to receive radar signals; control means on the flying body connected to said antenna and to said operating means and adapted to automatically acuate said operating means to effect movement of sid connecting means with said decoy antenna from said retracted position to said spaced position when said antenna receives radar signals; transmitter means on the flying body; a switching device connected to said control means and controlled by the same to connect said transmitter means with said connecting means and decoy means to supply to the same electromagnetic jamming signals when said antenna receives signals; and means for selectively supplying fuel to said tube, or jamming signals from said transmitter means to said wave guide means, whereby an attacking flying body having an infrared-responsive homing system or a radar homing system may be guided toward said decoy antenna means in said operative position emitting infrared or electromagnetic waves.

10. A decoy arrangement for a flying body, comprising, in combination, decoy means having means for discharging and igniting a fuel; connecting means for connecting said decoy means to the flying body and including a tube for supplying fuel to said means for discharging fuel; operating means on said flying body for moving said connecting means and said decoy means between a retracted position located in the flying body and a position in which said decoy means is spaced from the flying body; an antenna secured to the flying body and adapted to receive radar signals; means on the flying body connected to said antenna and to said operating means and adapted to actuate said operating means to move said connecting means with said decoy from said retracted position to said spaced position when said antenna receives radar signals whereby an attacking missile having an infrared-responsive guiding system is guided toward said decoy means when the fuel is discharged and ignited in said spaced position.

11. A decoy antenna for a flying body, comprising, in combination, decoy antenna means; connecting means for connecting said decoy antenna means to the flying body; operating means on the flying body for moving said connecting means and said decoy antenna means between a position located in the flying body and an operative position in which said decoy antenna means is located spaced a substantial distance from the flying body; an antenna secured to the flying body and adapted to receive radar signals; control means on the flying body connected to said antenna, said control means being operatively connected to said operating means for actuating the same to move said decoy antenna means to said spaced operative position when said antenna receives radar signals; transmitter means for producing electromagnetic jamming signals; wave guide means extending along said connecting means; and a switching device controlled by said control means when said antenna receives radar signals to connect said transmitter means with said wave guide means for supplying said jamming signals to said decoy antenna means when the same is in said spaced position whereby an attacking missile having a radar homing system is guided toward said decoy antenna means emitting electromagnetic waves.

12. A decoy antenna arrangement for a flying body, comprising, in combination, decoy antenna means having means for discharging and igniting a fuel; connecting means for connecting said decoy antenna means to the flying body and including tubular wave guide means and a tube for supplying fuel from the flying body to said decoy antenna means; said wave guide means including a stationary part and a movable part, and said tube including a stationary part and a movable part; coupling means for connecting said stationary parts with said movable parts for permitting passage of fuel and of waves between said stationary and movable parts; operating means on said flying body for moving said connecting means with said tube and said decoy antenna means between a retracted position located in the flying body and an operative position in which said decoy antenna means is located spaced a substantial distance from the flying body; transmitter means on the flying body for producing electromagnetic jamming signals; and means for selectively supplying fuel to said tube or jamming signals from said transmitter means to said wave guide means whereby an attacking flying body having an infrared-responsive homing system or a radar homing system may be guided toward said decoy antenna means in said operative position emitting infrared or electromagnetic waves.

13. A decoy antenna arrangement for a flying body, comprising, in combination, decoy antenna means having means for discharging and igniting a fuel; connecting means for connecting said decoy antenna means to the flying body and including tubular wave guide means and a tube for supplying fuel from the flying body to said decoy antenna means, said wave guide means including a stationary part and a movable part, and said tube including a stationary part and a movable part; coupling means for connecting said stationary parts with said movable parts for permitting passage of fuel and of waves between said stationary and movable parts; operating means on said flying body for moving said connecting means with said tube and said decoy antenna means between a retracted position located in the flying body and an operative position in which said decoy antenna means is located spaced a substantial distance from the flying body, said operating means including a rotary reel for winding up said movable parts of said wave guide means and of said tube, said wave guide means and said tube being concentric and said movable portions having an end portion concentric with the axis of rotation of said rotary reel and connected to said sealing and capacitive coupling means; transmitter means on the flying body for producing jamming signals; and means for selectively supplying fuel to said tube or jamming signals from said transmitter means to said wave guide means whereby an attacking flying body having an infrared-responsive homing system or a radar homing system may be guided toward said decoy antenna means in said operative position.

14. A decoy antenna arrangement for a flying body having a combustion engine with a metal exhaust, comprising, in combination, decoy means having nozzle means for discharging a fuel and constructed of a metal having the same infrared radiation spectrum as the exhaust of said combustion engine, and electric igniting means for igniting a fuel discharged by said nozzle so that the burning fuel produces infrared radiation; connecting means for connecting said decoy means to the flying body and including electric wire means connected to said igniting means, and a tube for supplying fuel from the flying body to said decoy means; operating means on said flying body for moving said connecting means with said tube and said decoy means between a retracted position located in the flying body and an operative position in which said decoy means is located spaced a substantial distance from the flying body; and means in said flying body for supplying fuel to said tube whereby an attacking flying body having an infrared-responsive homing system may be guided toward said decoy means in said operative position.

References Cited
UNITED STATES PATENTS

| 1,464,168 | 8/1923 | Booth et al. | 343—707 |
| 2,953,377 | 9/1960 | Brust | 343—18 |
| 2,954,190 | 9/1960 | Le Clair | 244—135 |
| 2,965,878 | 12/1960 | Ohlund | 273—105.3 X |
| 3,135,511 | 6/1964 | Norman et al. | 343—18 X |

RODNEY D. BENNETT, *Primary Examiner.*

LEWIS H. MYERS, CHESTER L. JUSTUS, *Examiners.*

J. P. MORRIS, *Assistant Examiner.*